United States Patent [19]

Hofmann et al.

[11] 4,431,692

[45] Feb. 14, 1984

[54] PROCESS FOR MAKING GLASS SURFACES ABRASION-RESISTANT AND ARTICLE PRODUCED THEREBY

[75] Inventors: William E. Hofmann; Louis C. Konst, both of Toledo, Ohio

[73] Assignee: Owens-Illinois, Inc., Toledo, Ohio

[21] Appl. No.: 289,429

[22] Filed: Aug. 3, 1981

Related U.S. Application Data

[63] Continuation of Ser. No. 121,843, Feb. 15, 1980, abandoned.

[51] Int. Cl.³ .................. B65D 23/00; B32B 7/00; B32B 15/00
[52] U.S. Cl. ..................... 428/35; 65/60.2; 65/60.3; 65/60.51; 65/60.52; 427/255; 427/255.2; 427/255.5; 427/407.2; 427/419.2; 428/432; 428/938
[58] Field of Search ............. 427/255, 253, 255.1, 427/255.2, 255.3, 255.5, 314, 419.2, 407.2; 428/35, 432, 938; 215/DIG. 6, 1 R; 65/60.2; 118/715, 720, 729

[56] References Cited

U.S. PATENT DOCUMENTS

| | | | |
|---|---|---|---|
| 2,953,483 | 9/1960 | Torok | 427/255 |
| 3,438,803 | 4/1969 | Dubble et al. | 427/255 |
| 3,516,811 | 6/1970 | Gatchet et al. | 427/255 |
| 3,623,854 | 11/1971 | Frank | 427/255 |
| 3,694,299 | 9/1972 | Wagner | 428/432 |
| 3,827,870 | 8/1974 | Fogelberg et al. | 427/255 |
| 3,850,665 | 11/1974 | Plumat et al. | 428/432 |
| 3,887,349 | 6/1975 | Akashi et al. | 65/181 |
| 3,925,050 | 12/1975 | Kushihashi et al. | 65/181 |
| 3,952,118 | 4/1976 | Novice | 427/255 |
| 4,123,244 | 10/1978 | Leclercq et al. | 427/255 |
| 4,125,391 | 11/1978 | Van Laethem | 118/729 |

Primary Examiner—Sadie L. Childs
Attorney, Agent, or Firm—T. L. Farquer; M. E. Click

[57] ABSTRACT

The present invention relates to improving the scratch and abrasion resistance of glass surfaces, and especially the exterior surfaces of glass containers such as bottles, jars, tumblers, stemware, and the like. Hollow glassware for container use is subject to abrasive contact with similar articles as well as handling equipment in the normal processes of manufacturing, packaging, filling and shipping. This invention further relates to providing improved abrasion resistance to glass articles and particularly hollow glass containers which are treated by the present hot-end process while retaining considerable heat of formation. The articles are then able to be overcoated at a lower temperature such as by organic materials to further improve their lubricity and durability. The subject process of providing a primary coating is markedly more economical than presently known processes.

15 Claims, 5 Drawing Figures

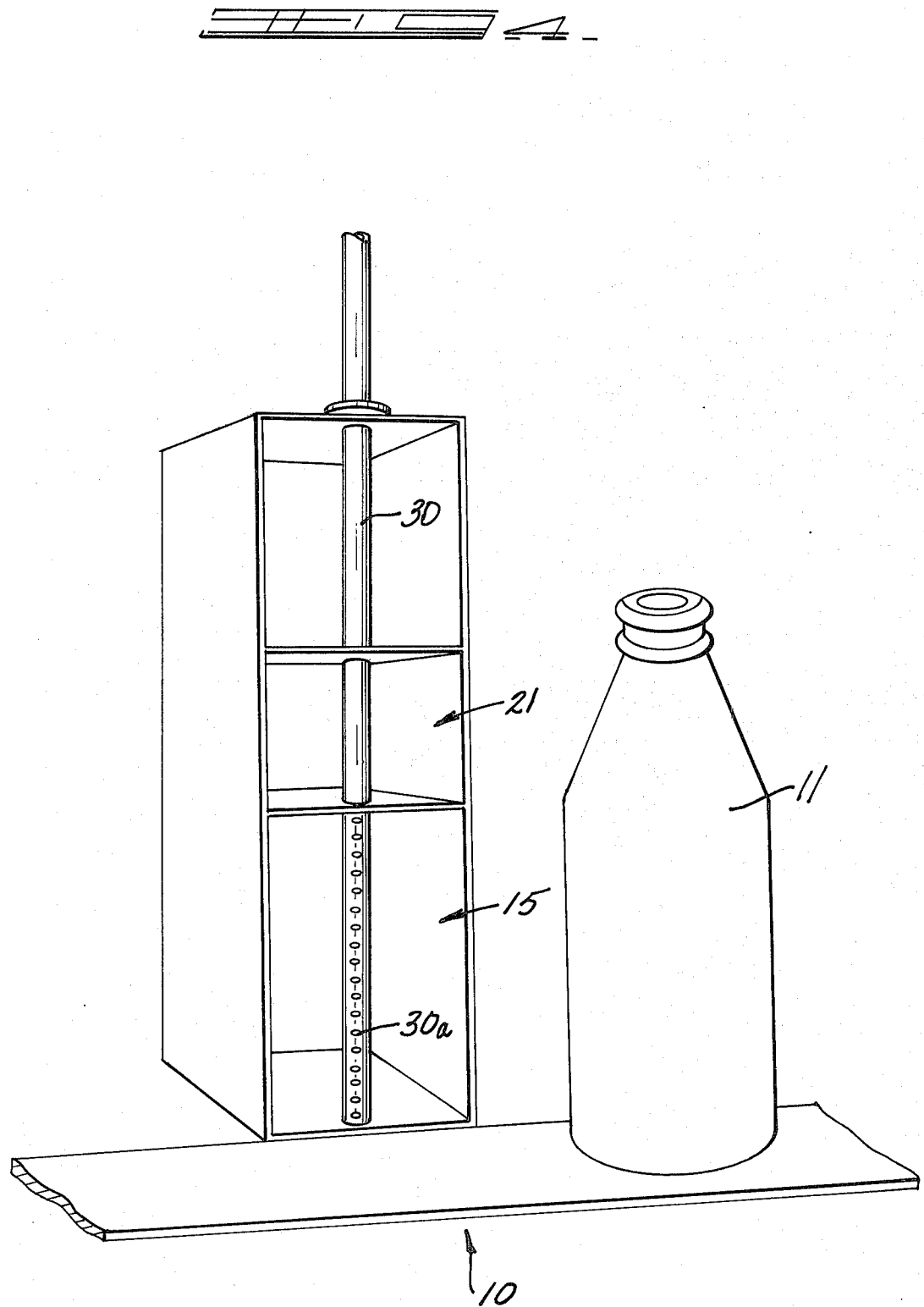

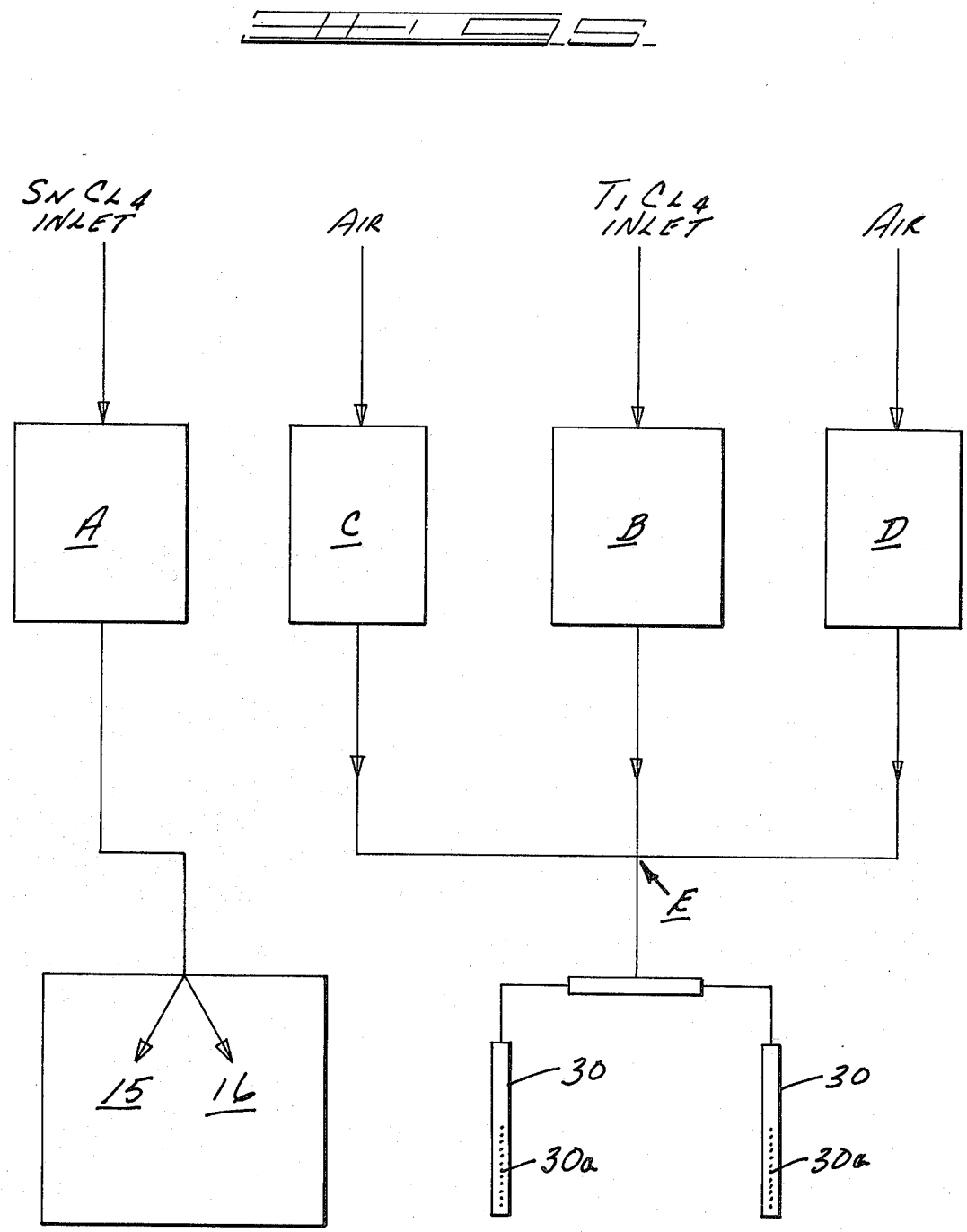

PROCESS FOR MAKING GLASS SURFACES ABRASION-RESISTANT AND ARTICLE PRODUCED THEREBY

This is a continuation of application Ser. No. 121,843 filed Feb. 15, 1980 now abandoned.

BACKGROUND OF THE INVENTION

1. Field of the Invention

It is generally known that glass derives its considerable strength from a pristine or unblemished surface condition and any scratches or flaws which occur or are developed on its surface decrease its strength many fold. Normally, glass containers exhibit a maximum strength immediately upon formation, and their strength decreases as the containers come into contact with one another, and with other surfaces, such as during automatic handling.

It is well understood that if the exterior glass surfaces are coated with a composition having good wet and dry scratch resistance, as well as abrasion resistance, which characteristicly decrease the likelihood of breakage, a greater number of containers can be handled by filling and packaging equipment in the same amount of time by spacing the containers closer together and by increasing the speed of the handling conveyors, even though the glass surfaces are subjected to greater contact with like and unlike surfaces. Also, since many products such as carbonated beverages are packaged under pressure, it is highly desirable that the exterior surfaces of the glass containers have a minimal number or no scratches to minimize the possibility of breakage.

2. Description of Prior Art

Various types of single and dual surface coating compositions have been employed previously to provide abrasion and scratch resistance, as well as desired lubricity and durability to withstand handling use.

U.S. Pat. No. 3,323,889 to Carl et al relates to a method for increasing the scratch resistance of a glass surface with a pyrolyzing treatment and a coating of an olefin polymer thereover. U.S. Pat. No. 3,368,915 to Carl et al relates to an abrasion-resistant glass article having dual protective coatings thereon made by the aforesaid method. Also, U.S. Pat. Nos. 3,403,015, 3,577,257, 3,598,632, 3,645,778, 2,813,045, 2,881,566, 2,982,672, 3,258,444, 3,407,085, 3,414,429, 3,418,153, 3,418,154, 3,425,859, 3,432,331, 3,438,801, 3,441,399, 3,441,432 and 3,445,269, all relate to rendering glass surfaces abrasion-resistant and glass articles produced thereby. In none of the foregoing processes are two metal oxide forming compounds applied simultaneously with a stream of hot, dry air to form a combined metallic oxide primary coating on glass surfaces in an economical manner, where one compound is highly reactive with atmospheric moisture and the other compound is much less reactive and serves a dessicating function to shield the application of the former.

SUMMARY OF THE INVENTION

Accordingly, it is an object of this invention to provide an improved abrasion resistant dual primary coating on glass surfaces which is highly resistant to abrasion and scratches, and which is economical to apply, thereby maintaining the inherent strength characteristics of the glass.

Another object of the present invention is to provide a thin, substantially-uniform coating on glass surfaces which coating is transparent and highly resistant to scratches and abrasive action in order to prevent weakening of the glass surfaces. Such uniform coating can be obtained during passage of the glass articles through a treatment chamber past stationary inlet ports for the treatment gas and without rotation of the glass articles.

A further object of this invention is to provide a method of coating glass surfaces, such as selected exterior surfaces of glass containers, in order to impart scratch resistant properties thereto, thus permitting the containers to withstand normal handling, filling, processing and shipping with the inherent rubbing and repeated contact of the glass surfaces with like and unlike surfaces resulting in no significant decrease in strength of the glass articles.

In achieving the objects of this invention, a primary feature resides in treating the glass surfaces simultaneously with at least two pyrolytically-decomposable metal-containing constituents, i.e., materials which are chemically decomposed by the action of heat to form oxides of the metals on the glass surfaces which are at a temperature above the pyrolyzing temperature of the constituents and then cooling the dual metal oxide-treated surfaces, such as in an annealing lehr, thereby providing strengthened glass articles. The treatment process is performed by protecting the more moisture-reactive constituent by a less moisture-reactive constituent during their combined application to the glass surfaces.

Another feature of the invention resides in treating the glass surfaces with tin-containing and titanium-containing compounds which are both pyrolyzable, i.e., chemically decomposable by the action of heat to form dual oxides on the glass surfaces while the glass surfaces are at a temperature above the pyrolyzable temperature of the several compounds, and then cooling the tin-titanium treated glass articles, such as in an annealing lehr. The metal oxide treatment may then be followed by the application of an organic overcoat of widely-varying types.

BRIEF DESCRIPTION OF THE DRAWINGS

FIG. 4 is an enlarged fragmentary perspective view showing the tubular delivery device for the delivering of the first gaseous constituent to the bottle.

FIG. 5 is a schematic block diagram of the gas flow to the coating apparatus.

DESCRIPTION OF THE PREFERRED EMBODIMENT

In practicing the present invention, the glass articles are treated soon after the articles leave the glass-forming machine and where they are being conveyed on a flight conveyor to the annealing lehr. This is immediately after their forming and while they still possess considerable heat from the molten state which is carried through the forming process. Two separate solutions of pyrolyzable compounds are sprayed onto the selected exterior surfaces of the glass articles in vaporized form and in a prescribed pattern flow at a temperature above the pyrolyzing temperature of the two individual compounds. The pyrolyzing temperatures for many common types of tin and titanium compounds which may be employed herein are between about 700° F. to 1300° F., with the more preferred being from about 900° F. to 1200° F. for their halide compounds.

Figure 1:
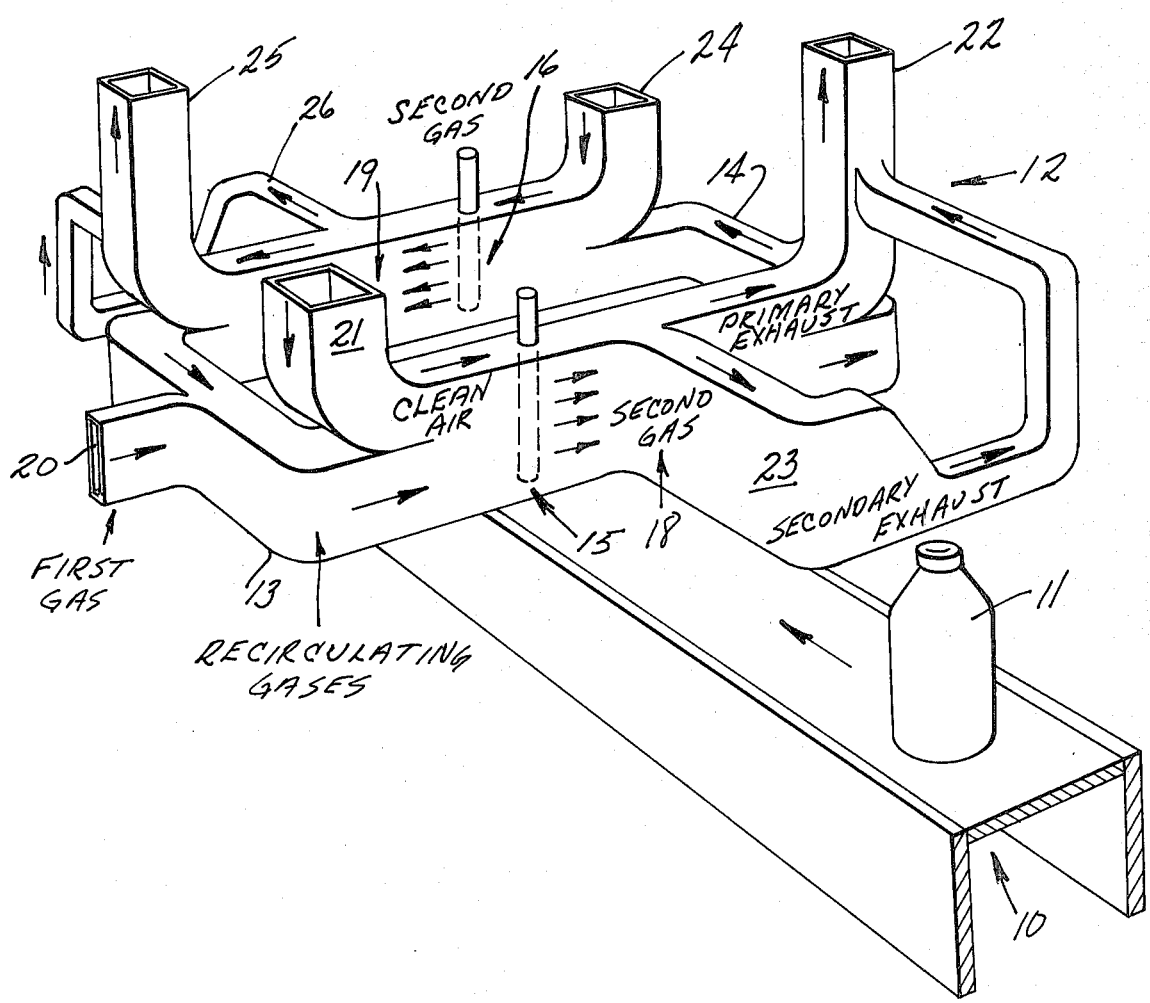
FIG. 1 is a schematic flow diagram of the gas flow in the subject coating apparatus showing the transported bottle and conveyor belt.

As shown in FIG. 1, the conveyor 10 is employed to transfer the newly-formed glass bottles 11 from a forming machine to an annealing lehr in regularly spaced apart alignment. The bottles are conveyed in upright relation on the upper reach of the conveyor surface through a treatment apparatus or hood 12. The bottles are not rotated or revolved during such generally horizontal conveyance, and fully adequate, uniform surface treatment is attained without rotation.

The treatment hood 12 is comprised of two side ducts 13 and 14, each of which have inlet ports 15 and 16 at one end and exhaust ports 17 and 18 at the other end. The inlet ports and exhaust ports of the hood 12 are located in transverse relation on opposite sides of the conveyor in diametrically opposing arrangement.

Figure 2:
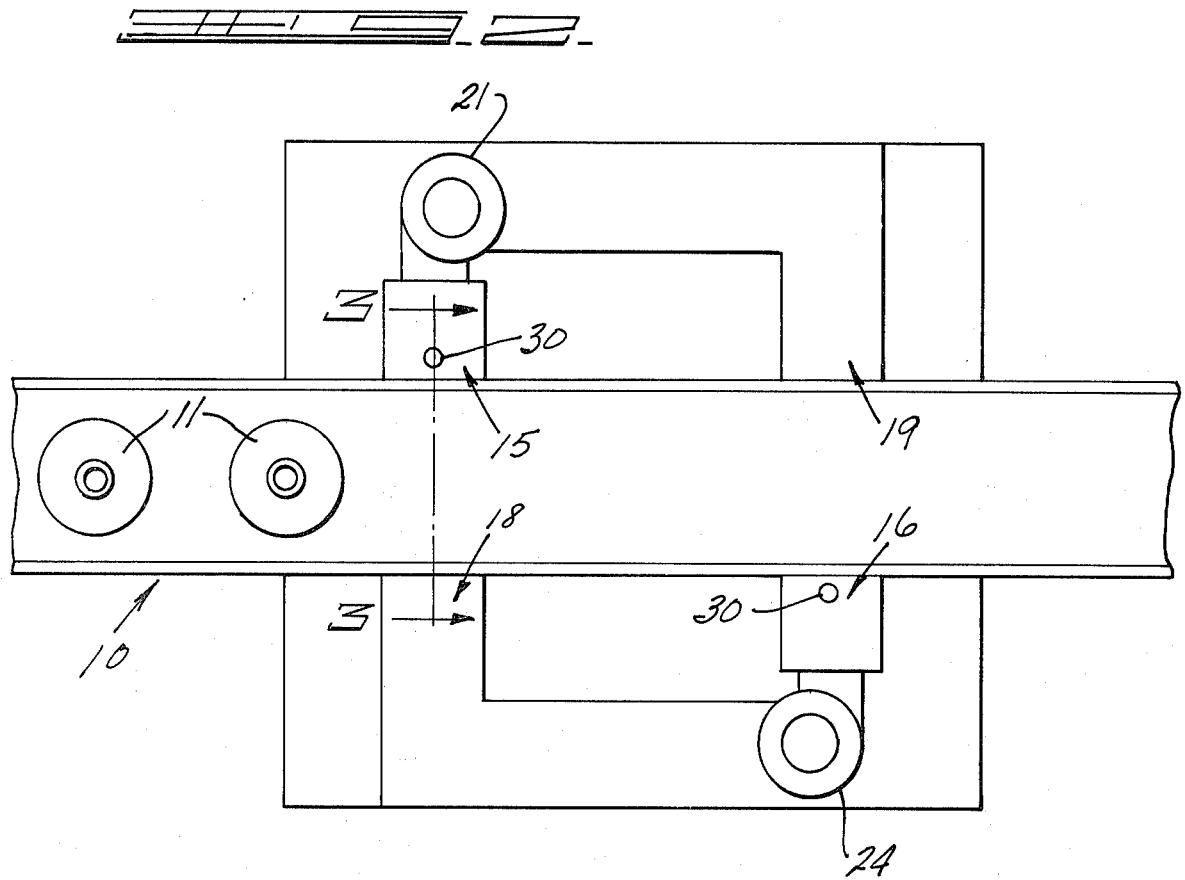
FIG. 2 is a schematic plan view of the coating apparatus of FIG. 1 showing the gas flow, bottle and conveyor.

The juxtaposed inlet ports and exhaust ports with their parallel side ducts are thus able to form a treatment gas recycling loop for the selected gases employed to treat the containers. The relative locations of the inlets, outlets and interconnecting side ducts are shown in FIGS. 1 and 2 over a limited horizontal reach of the conveyor, the hood enclosing the containers during a short time interval of their horizontal conveyance.

A first gas is introduced into one side duct 13 at one point, preferably at side inlet port 20. This gas serves to essentially fill the side duct 13 and surround a second gas introduced into the center of the gas stream at the conveyor inlet port 15. The first gas serves a dessicating function for the second gas which is introduced into the gas stream closely adjacent the conveyed containers 11.

Another duct 21 is mounted over side duct 13 to deliver clean auxiliary air across the conveyor adjacent and between an upper region of the inlet and outlet ports 15 and 18, respectively. A separate primary exhaust duct 22 for the clean air is located across from duct 21 to remove the air and excess gases after their sweep across the conveyor. The clean air sweeps around the upper extremity or mouth portions of the containers 11 to prevent deposition of the metal oxides thereat. A separate loop or secondary exhaust duct 23 extends from a central region of the hood parallel with the conveyor 10 and then to primary exhaust duct 22 to ensure that excess treatment gases and clean air are collected and directed into the primary exhaust duct 22.

Similarly, another auxiliary clean air duct 24 is mounted adjacent inlet and outlet ports 16 and 19, respectively, to deliver clean air over the mouth portions of the containers 11 to another primary exhaust port 25. Another secondary exhaust duct 26 extends from a region adjacent inlet and outlet ports 16 and 19 over a central downstream side of the conveyor to collect treatment gases and excess clean air and deliver the same into primary exhaust duct 25.

Figure 3:
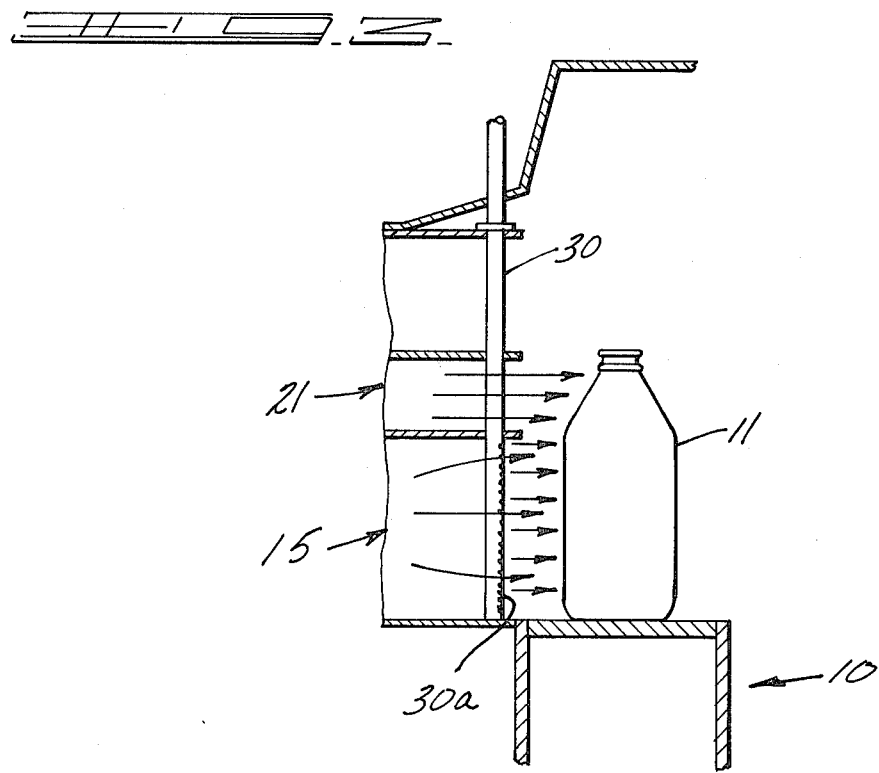
FIG. 3 is a fragmentary side elevational view taken along the line 3—3 of FIG. 2 showing the tubular delivery device for the first gaseous constituent, and the several ducts of the coating apparatus.

FIG. 2 shows, in schematic outline, the juxtaposed inlet and outlet ports at each of the two adjacent coating locations along the conveyor, the respective ports being in diametric, nearly closed-loop arrangement. FIG. 3 shows one inlet port 15 with the first gas delivered from its side inlet 20 and then through side duct 13 to the inlet port. The clean air is directed over the neck and mouth portion of the containers from upper duct 21.

A second gas is introduced into the center of this stream by a perforated pipe or wand 30 having a series of apertures 30a at the inlet area below auxiliary clean air duct 21. The apertures face the containers to direct the second gas into the center of the flow pattern to flow toward the closely-adjacent containers 11.

As stated, two separate solutions of pyrolyzable compounds are delivered onto the body portions of the glass containers. The vaporized solutions are directed at the containers in the prescribed flow pattern to impinge upon the containers at a temperature above the pyrolyzing temperatures of the two individual coating compounds, preferably tin and titanium containing.

FIG. 5 illustrates in block diagram how the tin containing compound, preferably tin chloride, is vaporized with air at point A, prior to its delivery into side duct 20 and then into the two side ducts 13 and 14 for delivery to inlet ports 15 and 16. The second titanium containing compound, preferably titanium tetrachloride, is delivered at point B from which it is introduced into a mixing tee E where it is intermixed with hot, dry, pressurized air from points C and D. The titanium compound vaporized with air is then delivered into the two pipes or wands 30 each having a lineal array of apertures 30a.

The two gases are preferably mixed having a volume ratio of the first constituent to the second constituent ranging from about 2:1 to 8:1 when both constituents in vapor form are generated at the same pressure and temperature.

The titanium compounds are more highly reactive with moisture than the tin compounds, thus having a great tendency to react with such moisture in hydrolysis reactions prior to their impingement onto the glass surfaces. The titanium compounds which have reacted with the available moisture are then not able to form as durable or uniform metallic oxide films on the glass surfaces. This is often the case where titanium tetrachloride alone is sprayed onto hot glass surfaces as a first coating. The titanium compounds upon reaction with water and water vapor tend to plug vaporizing nozzles with hydration products, thus interrupting the spray patterns and producing erratic results. A prescribed flow pattern with the titanium compound being centered in the stream surrounded by the tin compound in accord with this invention is preferred in order to deposit uniformly both metal oxides on the glass surface in a combined, very adherent and uniform coating.

The titanium compound employed in this invention is one which, upon contact with the heated surface, will react to form titanium oxide. Among the suitable titanium containing compounds are the titanium tetrahalides; and especially titanium tetrachloride. The ammonium salts of titanium lactate are also suitable. In addition, the volatile metallo-organic compounds such as alkyl titanates preferably where the alkyl group contains from 1 to 8 carbon atoms are also suitable. Among the alkyl titanates which may be used are tetrabutyl titanate, tetraisopropyl titanate, tetramethyl titanate, tetraethyl titanate, tetranonyl titanate, and the like.

The tin compounds that may be used for the purpose of the present invention include both stannous and stannic compounds. Among the suitable stannic compounds are the stannic halides and the alkyl stannic carboxylates. The stannic halides may be exemplified by stannic chloride, stannic bromide and stannic iodide. The alkyl stannic carboxylates have the general formula $(R_1)_x Sn(OOCR_2)_y$ wherein $R_1$ and $R_2$ are alkyl groups and wherein x and y are whole numbers from 1 to 3, the sum of which is equal to four. The alkyl groups may be branched or straight chain. The $R_2$ alkyl group preferably contains from 1 to 18 carbon atoms, such as stearate, palmitate, laurate, and the like. The $R_1$ alkyl group preferably contains 1 to 8 carbon atoms such as methyl, propyl, butyl, isopropyl, isobutyl, hexyl, octyl, and the like. Included among the compounds coming within the scope of the foregoing are dibutyl tin dichloride, butyl tin acetate, dipropyl tin diacetate, diioctyl tin diacetate, dibutyl tin distearate, dibutyl tin dipalmitate, dibutylin dilaurate, dibutyl tin maleate, and the like.

Among the stannous tin compounds suitable for the purpose of this invention are the stannous dihalides such as stannous chloride, stannous bromide, stannous iodide and the carboxylic acid salts of stannous tin. The latter include compounds having the formula $Sn(OOCR)_2$ wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. The carboxylic acid salts suitable for the purpose of this invention include stannous oleate, stannous palmitate, stannous stearate, stannous caproate, stannous laurate, stannous maphthenate, stannous tartrate, stannous gluconate, stannous acetate, and the like. It is understood that any titanium or tin compound may be used, provided it is capable of forming an oxide on the glass surface at the reaction temperatures indicated.

The titanium and tin compounds which are preferably employed in the present invention are ones which upon contact with the heated glass surface react to form a substantially colorless, transparent, layer or coating of combined metallic oxides, both $TiO_2$ and $SnO_2$, on the glass surfaces. The combined oxide coating is firmly adherent to the glass surface and is of the order of a few microns in thickness. Such dual coating serves as a primary coating for an overlying second layer or coating preferably of organic material applied at a lower temperature.

The glass articles, when coated with the thin, dual oxide primary coating, are then transferred to an annealing lehr, where they are progressively cooled and stress annealed over a period of time. When cooled to a temperature of about 400° F. and lower, during a latter phase of the annealing cycle, they are normally sprayed with a second coating of polyethylene emulsion, for example, to provide a protective lubricant coating. Such second coating or layer can be varied widely depending upon the end use requirements and does not comprise a part of the present invention. One such second coating or layer comprised polyethylene constitutes a typical overcoat, such polyethylene emulsion distributed by Owens-Illinois, Inc., Toledo, Ohio, under the trade name "Duracote". U.S. Pat. No. 2,995,533 to Parmer and Schaefer, issued Aug. 8, 1961, entitled, "Lubricant Coating for Glassware", discloses the preparation and use of a polyethylene emulsion as a lubricant coating for glass containers, this patent being assigned to the same assignee as the present application. The organic coating composition can be applied by any suitable apparatus such as a traversing spray nozzle delivering a uniform amount of coating material per unit area of lehr belt. The amount is frequently established at between about ½ to 1 quart of organic coating per 100 square feet of lehr belt. It is preferred that organic overcoat be applied by spraying near the cool end of the lehr such as when the glass articles are in the temperature range of from about 100° F. to 400° F.

Returning to discussion of the first primary coating, with which this invention is primarily concerned, the second constituent of the gas treatment is normally a high moisture-reactive gas such as titanium tetrachloride which normally cannot be satisfactorily applied alone to the glass surface. At least, such reactive vaporized constituent frequently encounters stoppage problems when employed singly to coat glassware over long-term campaigns. In accordance with this invention, this compound in gaseous form is combined in regulated amount with a heated, dry stream of pressurized air for delivery to a central region at the inlet ports of the treatment hood. The ratio of treatment gas to dry hot air is carefully controlled, the latter usually being in excess to guard against hydrolysis of the former.

The second gas is preferably titanium tetrachloride due to its economical cost and ready availability. It is combined with the heated, dry air in a mixing tee immediately prior to use. The dry, hot air is heated to about 300° F. and having a dew point of less than about $-80°$ F. the mixed $TiCl_4$ and hot, dry air are delivered together to a perforated pipe or wand which is mounted vertically in the center of the inlet port. Two such inlet ports are used in the treatment chamber, on diametrically opposite sides of the container conveyor belt. Each perforated pipe or wand has a series of apertures facing the conveyed containers and in close proximity thereto, the apertures preferably being about 1/16 inch diameter. Each wand is located in the center of the inlet duct which carries the less moisture-reactive, first gas such as stannic chloride to the inlet port area. The $SnCl_4$ is normally carried by dry, pressurized air in the inlet duct and serves to surround the more moisture-reactive second gas such as $TiCl_4$. Thus, the $TiCl_4$ is protected from reaction with atmospheric moisture prior to its delivery onto the adjacent hot glass surfaces. The two metal-containing gases are directed against the hot glass surfaces of the container and are deposited thereon in the form of metal oxides. The body portion of the container normally comprises the selected surface areas of the container for such coating, the mouth or finish portion of the container being protected by the delivery of auxiliary hot dry air to prevent metal oxide deposition thereon.

The first and second gas constituents which flow under pressure within the treatment chamber and across the conveyor surround and uniformly coat the exterior surfaces of the container body portion. Excess treatment gas is transported through the exhaust port across from the inlet port and through the side duct extending parallel to the conveyor to the second inlet port.

The secondary perforated pipe or wand is located in vertical alignment in the second inlet port facing across the conveyor. An amount of second treatment gas, i.e., $TiCl_4$, equivalent to that introduced at the initial inlet port is then introduced at the secondary inlet port. The two metal-containing gases, i.e., $TiCl_4$ and $SnCl_4$, are then forcefully directed across the conveyor belt from the opposite direction to impinge upon the other side of the container body surfaces. At both inlet ports of the treatment chamber, the second gas, i.e., $TiCl_4$, is surrounded by the first gas, i.e., $SnCl_4$, so that little or no adverse reaction with moisture or water vapor by the susceptible second gas can occur. The container exterior surfaces are then essentially uniformly coated around their circumference and from top to bottom of their body portions, the mouth of finish portion of the container being uncoated. The exterior surfaces, from inlet facing sides to conveyor axis sides, of the non-rotated container, show some variation in thickness within the desired range of uniformity for improved durability.

The excess treatment gas from the second inlet port is transported through the side duct parallel to the conveyor axis back to the initial inlet port, where the gas treatment loop is completed. Except for the container openings which exist at the opposite ends of the treatment hood and through which the conveyor belt is mounted, and upon which the glass containers are moved, the hood is totally enclosed for maximum efficiency of container treatment.

The titanium tetrachloride compound is a much less expensive constituent than the stannic chloride compound, thereby permitting much more economical coating of glass articles. The ratio of amount of second constituent to first constituent can be varied through wide limits so that very appreciable amounts of the cheaper constituent can be used, thus significantly decreasing coating costs. The volume ratio of second constituent to first constituent can suitably range from about 2:1 to 8:1 when both constituents are generated at the same pressure and temperature. Thus, substantially more $TiCl_4$ can be combined with the $SnCl_4$ for their joined deposition on a combined unitary coating on the glass surfaces. Both metals being of the same Periodic Group permit their joinder as a thin coating having physical and chemical properties somewhat similar to the individual oxides when deposited alone in the form of thin films. Treatment results using mixtures of tin and titanium oxides in combination are very comparable to results obtained with tin oxide only. Material costs can be significantly reduced using mixtures of tin and titanium compounds as opposed to a tin compound only.

The size openings in the perforated pipes or wands for delivery of the $TiCl_4$ into the gas stream is not critical, but it is important that such constituent be combined with super-dry, hot air and be introduced into the center of such combining stream closely adjacent the point of deposition. The quantity of dry air is important, and usually from 50 to 100 cubic feet per hour of heated, super-dry propellant air is used to convey the $TiCl_4$ into the delivery wands. Total flow rates of from 30 to 100 cubic feet per hour of the mixed working $TiCl_4$ containing vapor is delivered into the gas stream for container coating.

By keeping the metal oxide coating off the finish area of the containers, such especially lessened tin oxide thereat, steel cap corrosion is prevented or significantly lessened when the containers are filled and capped with such closures.

The dual coating of tin and titanium oxides permits the attainment of a uniformly-distributed, chemically-reactive, metallic oxide coating on glass containers prior to their annealing which will combine with organic surfactants applied at a lower temperature to achieve a scratch-resistant, strength-retentive lubricious exterior coating for glass containers. The dual coating of tin and titanium utilizes the best features of both materials, i.e., the uniformity of the $SnCl_4$ application and low cost of the $TiCl_4$ material, to produce an acceptable coating distribution comparable with that achieved with tin containing materials used alone but at a greatly reduced cost per container.

The present process can be used with many existing types of treatment hoods or chambers designed for $SnCl_4$ treatment alone. Only the perforated pipes and hot air mixing equipment for transporting the $TiCl_4$ need be used for the surrounded second gas. Thus, both materials can be applied in the same apparatus and, if desired, with only slight modification of standard types of hoods. The recirculating $SnCl_4$ vapors tend to shield the $TiCl_4$ vapors, making the resulting coating more uniform and considerably less expensive.

Stannic chloride ($SnCl_4$) is usually generated at a given temperature (normally ambient) by bubbling dry air ($-40°$ F. or lower dew point), or dry nitrogen, or by passing this dry air over the liquid material to form a vapor. Titanium tetrachloride ($TiCl_4$) vapor is generated in the same manner using hot, dry air ($-60°$ F. or lower dew point), or dry nitrogen over the liquid $TiCl_4$ to form a vapor. Both vapors are introduced into the treatment chamber with the tin vapor being introduced from a single source into a recirculating vapor/air stream. The titanium vapor is mixed with dry air (as stated) preferably heated above about 300° F., and introduced into the treatment chamber at two points in close proximity to the glass articles being treated.

Generally, where 30 cubic feet per hour of bubbling gas is required to achieve tin oxide coatings on glass container surfaces, between the minimum required to achieve good scratch protection (when overcoated with a suitable organic lubricant) and an upper limit defined by the coating visibility limit, it is possible to attain a dual tin-titanium coating with 80 cubic feet per hour of dry air bubbled through the $TiCl_4$ with only 10 to 15 cubic feet per hour of $SnCl_4$ bubbling gas required. At any given ambient temperature, tin to titanium flow ratios of 1:6 to 1:8 will produce the desired combination coating on the glass surfaces.

The following table indicates typical process comparisons between the tin only and titanium only known coating processes and the dual coating process results using both metals, with the material consumptions. Comparative coating thicknesses are listed as well as the vaporizing flow rates.

| | Material | Vaporizing Flow Rate | Max/Min Coating Thickness Ratio | Average Coating Thickness | Wt of Tin Consumed | Wt of Titanium Consumed |
|---|---|---|---|---|---|---|
| 1. | $SnCl_4$ Alone | 30 CFH | 2.8:1 | 33.5 CTU | 1.22#1hr | |
| 2. | $TiCl_4$ Alone | 80 CFH | 72:1 | 22.0 CTU | — | 0.4#1hr |
| 3. | Dual Coating $SnCl_4$ $TiCl_4$ | 10 CFH 80 CFH | 4.8:1 | 41.2 CTU | 0.4#1hr | 0.4#1hr |
| 4. | Dual Coating $SnCl_4$ $TiCl_4$ | 15 CFH 80 CFH | 3.05:1 | 41.0 CT | 0.6#1hr | 0.4#1hr |

We claim:

1. The method of forming a protective coating on selected exterior surface portions of a glass container comprising the steps of forming a gaseous stream of a dry, pyrolytically-decomposable treatment gas comprising a highly moisture-reactive first gaseous metal-containing constituent confined to the center of said gaseous stream as viewed in cross-section and a less moisture-reactive second gaseous metal-containing constituent surrounding said first constituent of said gaseous stream as viewed in cross-section to isolate said moisture-reactive first constituent from atmospheric moisture and prevent hydrolysis thereof, introducing said gaseous stream of treatment gas into a treatment chamber through at least one inlet port and exhausting the treatment gas from said treatment chamber through exhaust means thereby creating a positive flow pattern from the at least one inlet port to exhaust means, the said flow pattern being confined substantially to the selected exterior surface portions of the glass container, passing a glass container at a temperature above the decomposition point temperature of the treatment gas constituents through the treatment chamber, maintaining said open mouth portion of said glass container out of contact with the treatment gas constituents during said passage, forming a substantially uniform coating of both constituents in the form of metallic oxides on the selected exterior surface portions of said container within the treatment chamber from the decomposition products of the treatment gas constituents, and removing the said container from the treatment chamber whereby the protruding mouth portion of the container is uncoated and the selected exterior surface portions of the container are protectively coated.

2. The method in accordance with claim 1, wherein said highly moisture-reactive first gaseous metal-containing constituent of the treatment gas is titanium tetrachloride and said less moisture-reactive second gaseous metal-containing constituent of the treatment gas is stannic chloride.

3. The method in accordance with claim 2, including the step of mixing the said treatment gas with dry air having a dew point temperature of less than about −80° F. and which has been heated to at least about 300° F.

4. The method in accordance with claim 2, including the steps of injecting the highly moisture-reactive first constituent of titanium tetrachloride into the center of the flow pattern of said treatment gas at said at least one inlet port and injecting the less moisture-reactive second constituent of stannic chloride around the center of the flow pattern of said treatment gas at said at least one inlet port.

5. The method in accordance with claim 2, including the step of injecting the treatment gas having a volume ratio of the first constituent to the second constituent ranging from about 2:1 to 8:1 when both constituents in vapor form are generated at the same pressure and temperature.

6. The method in accordance with claim 1, wherein said glass container is retained in non-rotational upright alignment between said at least one inlet port and said exhaust means during its passage through said treatment chamber.

7. The method in accordance with claim 1, including the step of creating a recirculating stream of said treatment gas to constitute a continuous flow pattern of said treatment gas between inlet ports to exhaust means and from said exhaust means to said inlet ports.

8. The method in accordance with claim 3, including the step of providing at least two treatment zones within said treatment chamber, the said two zones being adjacent and having their inlet ports and exhaust means diametrically opposed transversely to the path of said container and interconnected into a treatment gas recycling loop.

9. The method of applying an abrasion resistant coating to hot glass articles comprising the steps of transporting the glass articles upon the surface of a conveyor, directing a dry gaseous stream, comprising, as viewed in cross-section, a decomposable, highly moisture-reactive titanium-compound-containing vapor surrounded by a decomposable, less moisture-reactive tin-compound-containing vapor to isolate said moisture-reactive titanium-compound-containing vapor from atmospheric moisture and prevent hydrolysis thereof, to desired selected exterior surfaces of said glass articles while maintaining said selected exterior surfaces contacted by said vapors above the decomposition point temperatures of the decomposable compounds whereby a substantially uniform protective scratch-resistant combined coating of tin and titanium oxides is formed upon the said exterior surfaces of the glass articles.

10. The method in accordance with claim 9, wherein said decomposable, highly moisture-reactive titanium-compound-containing vapor is titanium tetrachloride and said decomposable, less moisture-reactive tin-compound-containing vapor is stannic chloride, said titanium tetrachloride being injected into the center of the gaseous stream of the treatment gas vapors as viewed in cross-section and said stannic chloride being injected around the center of the gaseous stream of the treatment gas vapors as viewed in cross-section.

11. The method in accordance with claim 9, including the step of conveying a glass container with its mouth portion protruding beyond the treatment gas vapors to protect said mouth portion therefrom.

12. As a product-by-process, a glass container having a protective coating over selected portions of its exterior surfaces which is formed by subjecting the newly-formed container possessing substantial heat of formation to an atmosphere of a dry, pyrolytically-decomposable treatment gas containing at least two constituents and directed in a positive flow pattern from inlet ports to exhaust means, a highly moisture-reactive first constituent confined to the center of said flow pattern as viewed in cross-section and a less moisture-reactive second constituent surrounding said first constituent of said flow pattern as viewed in cross-section to isolate said moisture-reactive first constituent from atmospheric moisture and prevent hydrolysis thereof, the said container passed through the flow pattern of the treatment gas at a temperature above the decomposition point temperature of the treatment gas constituents with the mouth portion of said container extending beyond the treatment gas flow pattern, the outwardly extending mouth portion of said container being uncoated and the selected exterior surface portions of said container being protectively coated.

13. The product-by-process in accordance with claim 12, said glass container having a combined thin uniform coating of tin and titanium oxides over its selected exterior surface portions.

14. The product-by-process in accordance with claim 12, wherein said flow pattern of treatment gas contains dry air having a dew point temperature of less than about −80° F. and which is heated to at least about 300° F.

15. The product-by-process in accordance with claim 12, wherein said treatment gas has a volume ratio of first constituent to second constituent ranging from about 2:1 to 8:1 when both constituents in vapor form are generated at the same pressure and temperature.

* * * * *